J. A. VENTRESS.
COTTON GIN.
No. 20,747. Patented June 29, 1858.
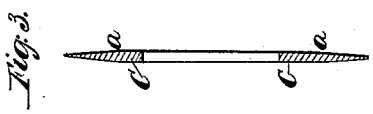
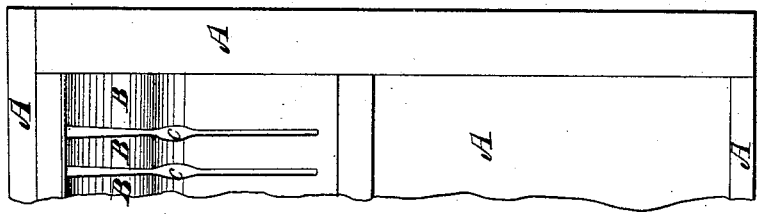
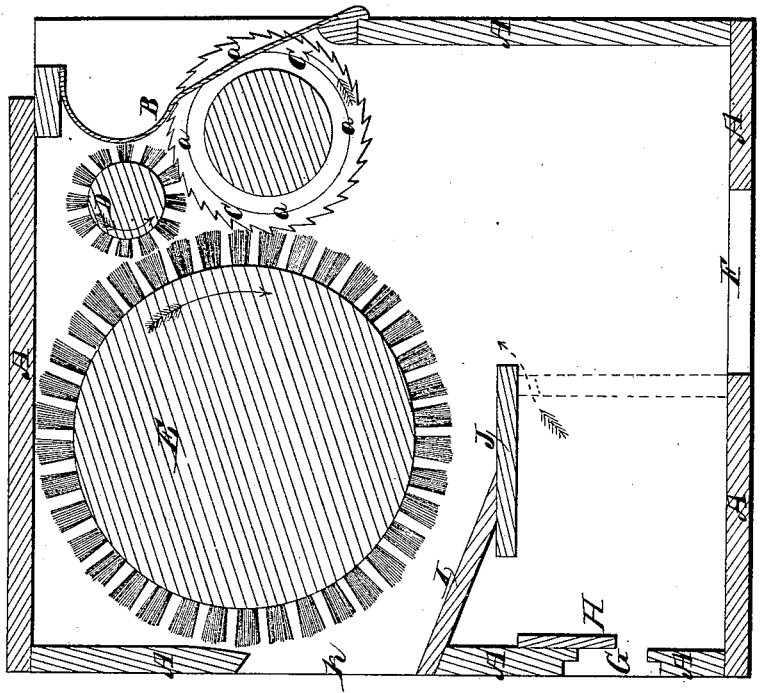

UNITED STATES PATENT OFFICE.

J. A. VENTRESS, OF WOODVILLE, MISSISSIPPI.

IMPROVEMENT IN COTTON-GINS.

Specification forming part of Letters Patent No. 20,747, dated June 29, 1858.

*To all whom it may concern:*

Be it known that I, J. ALEXANDER VENTRESS, of Woodville, in the county of Wilkinson and State of Mississippi, have invented certain new and useful Improvements in Cotton-Gins; and I do hereby declare the following to be a full, clear, and exact description of the construction and operation of the same, reference being had to the accompanying drawings, making a part of this specification, in which—

Figure 1 represents a vertical cross-section through the machine, or so much of it as will fully illustrate the characteristics of the invention herein claimed. Fig. 2 represents a front view of the ribs between which the cotton is carried in by the saws. Fig. 3 represents a section through one of the saws, to show the manner in which a portion of its perimeter is reduced in thickness, for a purpose that will be explained.

In the practical operation of cotton-gins, difficulties have presented themselves which have not heretofore been overcome by any machines of which I have knowledge. In the first place, the cotton is injured in the machines as at present constructed, while being carried between the ribs, by the saws, it being brought in contact with said ribs, by the close proximity thereto of the saws, or by the consequent vibration of the saws, or by both causes, which very much injures the staple.

The object of my invention is to remedy this defect, and it consists in making the saw-plates much thinner upon their edges, where their teeth are cut, and for a short distance below the gullets or roots of the teeth than the remaining portions of the plates, so that the cotton cannot be crowded between said saw-plates and the ribs in ginning by any vibration of the plates or saws, or, in what would be the equivalent of reducing the thickness of the saw-plates, the enlarging of that portion of the space or slot between the adjacent ribs through which the cotton is carried, by the points of the saw-teeth, so as to prevent the cotton from being brought in contact with the edges of said ribs, the object being to so open a space at the point or place where the cotton passes through between the ribs, that it cannot be injured by being brought in contact with said ribs.

A second difficulty in cotton-gins as at present constructed, is caused by the irregular draft or current of air produced in part by the motion of the brush-cylinder, and by the opening or closing of the doors of the gin-house, and also by the passing and repassing of the attendant at the front of the gin, where the air is most commonly admitted to supply that driven out by the rotation of the brush-cylinder, and by the accumulation of seed when they are allowed to escape through the ordinary openings which supply the air to the interior of the gin. In the "moting" of the cotton these irregular currents of air operate injuriously and often cause an entire failure in this part of the operation while ginning.

To enable those skilled in the art to make and use my invention, I will proceed to describe the same with reference to the drawings.

A may represent a tight frame of any suitable size, shape, or material, in which are placed the ribs B, the saws C, the mote-cylinder D, and the brush-cylinder E, said saws and cylinders having the motions, respectively, as shown by the red arrows in Fig. 1. The top and sides of the gin-frame are entirely closed. The front entirely closed, except the slots between the ribs, which are so inconsiderable, together with the fact that they are closed so nearly by the cotton in the feed-hopper, of which the ribs form one of the sides, that it may be said that the front is practically closed against the admission of air. The bottom part of the frame has an opening, F, through it for the dust, motes, and trash to fall into; but this opening F is connected to a tight trunk or box, or may lead into a tight compartment below the gin-room, so that no draft or currents of air can pass into or through the gin from this one of its sides. The back of the gin-frame which is farthest from the doors leading into the gin-room, as also from the attendant who stands at the front or hopper end of the gin, may have an opening, G, through it, which may be provided with a damper or register, H, for adjusting or regulating the area of the air-inlet to the kind or character of work that is being done. The air thus admitted to the lower part of the gin, and directed by the partitions I J, has its force broken while it is not influenced by any extraneous causes, and thus does not affect the action of the mote-cylinder D, nor of the brush-cylinder E, as they are comparatively protected against any irregular currents of air, and, thus protected, do their work effectually without wasting the staple or throwing it out in bunches or tangled masses. It is not actually material that the air should be let in through the rear of the machine, though that is generally the most available part for the purpose. It may be brought in from any other quiet undisturbed place or compartment.

The saws C are made as follows: That part of their perimeters, say, from the line $a$ to the points of their teeth—are made thinner than their remaining portions, the object being that the teeth of the saws in carrying in the cotton through between the ribs, shall not bring said cotton in contact with said ribs, which very much injures it; or, instead of thinning off the outer part of the saw-plate and the saw-teeth, that part or point of the slot between the adjacent ribs through which the cotton is to pass may be enlarged, as shown at $c$, Fig. 2, and effect a similar object; or a portion of the clear space may be made by thinning the plate and a portion by enlarging the space.

It is obvious that the entire slots between the ribs cannot be made any larger than merely to allow the saw-plates to freely move between them, for if so they would overfeed and clog or choke up; but at the point where the cotton passes through between the ribs a free passage is required to prevent injury to the staple, and this free passage I obtain by the means herein set forth, without in anywise affecting the other functions of the saws and ribs.

I have said that the back of the gin-frame was tight except so far as the opening G was concerned. This should be qualified by saying that it was closed, so far as an inlet for the air was concerned, except by the opening G; for there is an exit-opening, K, in the rear part of said frame through which the ginned or cleaned cotton passes out of the gin.

The method of gearing and driving the several parts of the gin, and the general construction of the saw and brush cylinders may be of the ordinary well-known plans, and I have not specially described them, as they constitute no part of my invention; but those parts which embrace my invention I believe I have fully explained and represented.

The back and lower part of the gin may be further formed into a close box by the introduction of a partition, as shown by dotted lines in Fig. 1, said partition extending clear across the gin, and from the mote-board J to the bottom of the gin, as shown, and this partition may have air-openings or an air-opening through it, to allow the air to pass into the gin and supply that driven out by the cylinders.

There are many ways by which air can be admitted to the gin in a calm state, so as to prevent currents of air through the gin as much as possible, and this is very material to the proper moting of the cotton.

Having thus fully described the nature and object of my invention, what I claim therein as new, and desire to secure by Letters Patent, is—

In combination with the ribs set close up to the saws, forming of a clear space between the ribs at that point where the teeth of the saw carry the cotton through them, to prevent said cotton from being brought in contact with said ribs, substantially as and for the purpose set forth.

J. ALEX. VENTRESS.

Witnesses:
WM. STAMPS,
E. I. ELDER.